March 22, 1927. 1,621,599
J. PROKSA
PROJECTING APPARATUS
Filed March 21, 1925 8 Sheets-Sheet 1

Witnesses:
William P. Kilroy
Harry L. White

Inventor:
John Proksa

March 22, 1927.

J. PROKSA 1,621,599

PROJECTING APPARATUS

Filed March 21, 1925    8 Sheets-Sheet 4

Witnesses:
William P. Kilroy
Harry R. White

Inventor:
John Proksa
By
Attys

March 22, 1927.  J. PROKSA  1,621,599

PROJECTING APPARATUS

Filed March 21, 1925  8 Sheets-Sheet 5

Witnesses:
William P. Kilroy
Harry R. L. White

Inventor:
John Proksa

March 22, 1927.  
J. PROKSA  
1,621,599  
PROJECTING APPARATUS  
Filed March 21, 1925  
8 Sheets-Sheet 6

Witnesses:
William P. Kilroy

Inventor:
John Proksa

By
Att'ys

March 22, 1927.

J. PROKSA 1,621,599

PROJECTING APPARATUS

Filed March 21, 1925    8 Sheets-Sheet 7

Witnesses:
William P. Kilroy
Tracy P. White

Inventor:
John Proksa
By

March 22, 1927.
J. PROKSA
1,621,599
PROJECTING APPARATUS
Filed March 21, 1925   8 Sheets-Sheet 8
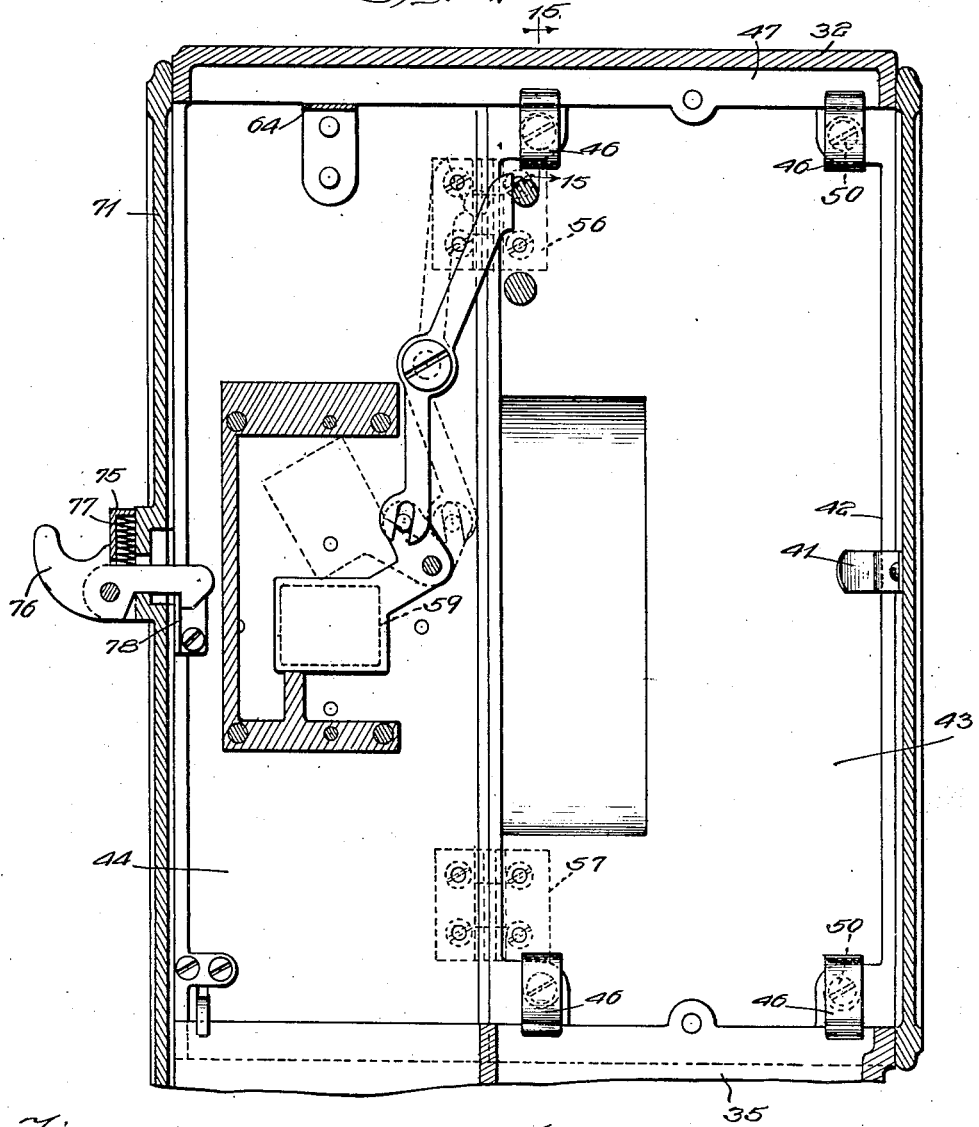
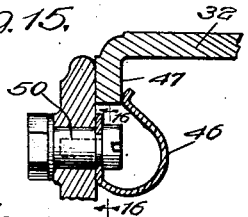
Witnesses:
William P. Kilroy
Harry R. L. White
Inventor:
John Proksa
By
Attys.

Patented Mar. 22, 1927.

1,621,599

UNITED STATES PATENT OFFICE.

JOHN PROKSA, OF CHICAGO, ILLINOIS, ASSIGNOR TO HELIOS CORPORATION, OF CHICAGO, ILLINOIS, A CORPORATION OF DELAWARE.

PROJECTING APPARATUS.

Application filed March 21, 1925. Serial No. 17,340.

My invention relates to improvements in motion picture projecting apparatus and has among its other objects the production of apparatus of the kind described which is simple, convenient, compact, durable, reliable, efficient and satisfactory for use wherever found applicable. A particular object of the invention is to provide improved apparatus of the kind described through which a film may be quickly and easily threaded. Many other objects and advantages of the construction herein shown and described will be obvious to those skilled in the art from the disclosures herein given. To this end my invention consists in the novel construction, arrangement and combination of parts herein shown and described, and more particularly pointed out in the claims.

In the drawings, wherein like reference characters indicate like or corresponding parts:

Figure 1:
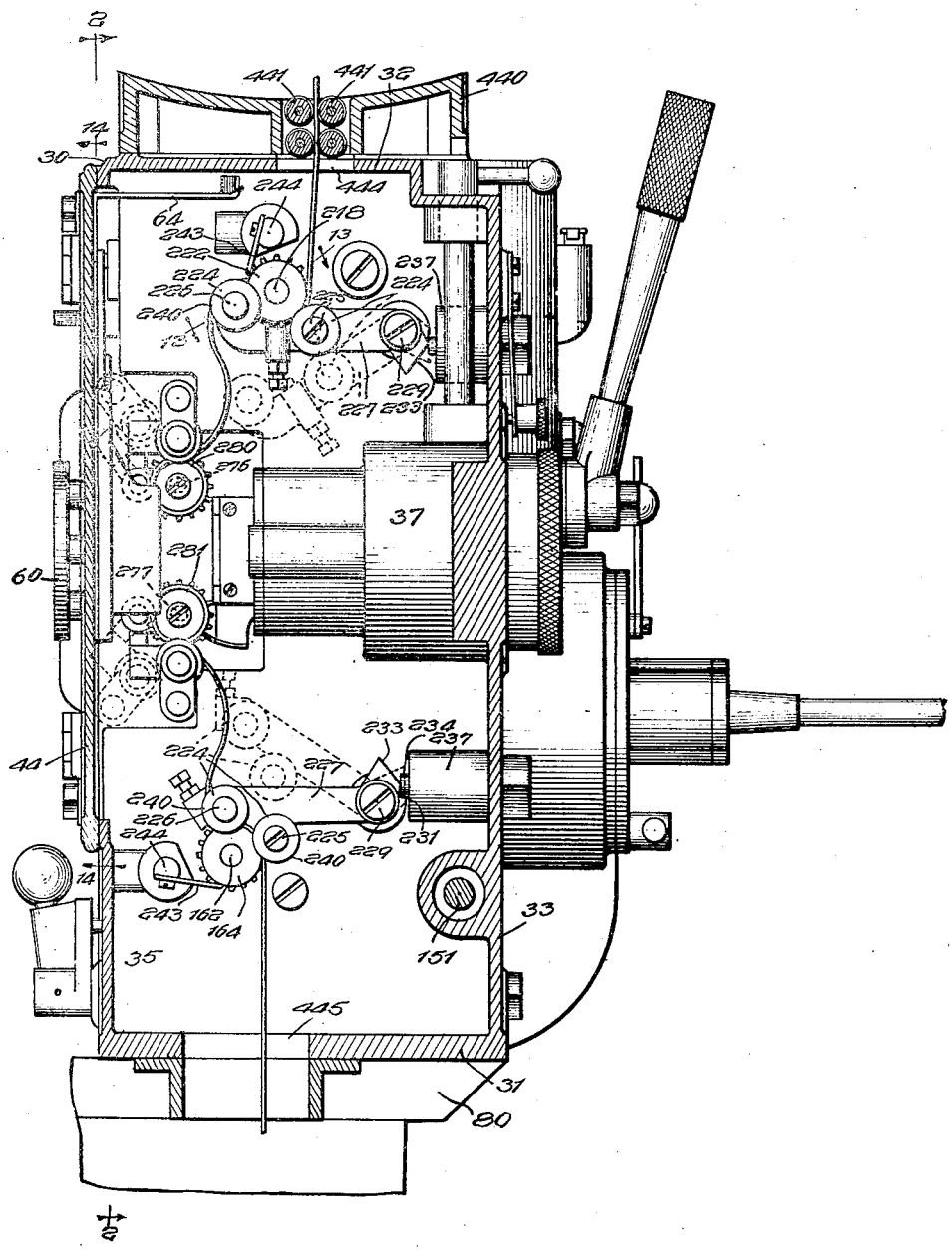
Fig. 1 is a section taken on line 1—1 of Fig. 2 and illustrates one form of my invention.
Figure 2:
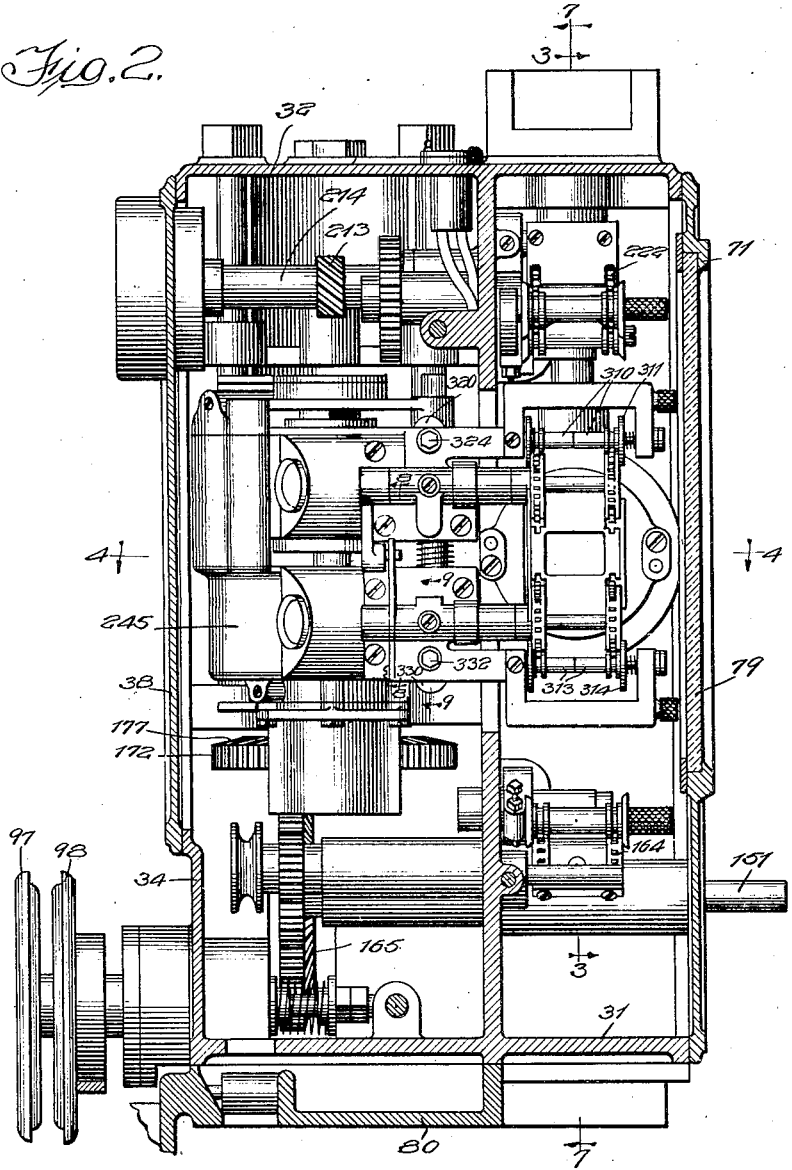
Fig. 2 is a section taken on line 2—2 of Fig. 1.
Figure 8:
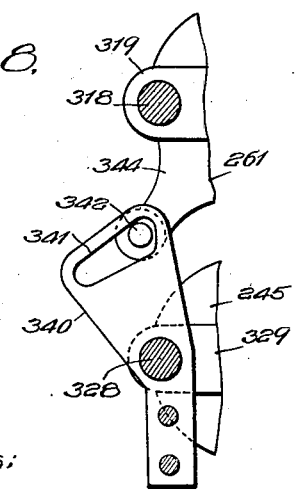
Figure 9:
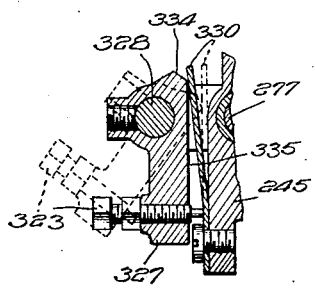
Figure 10:
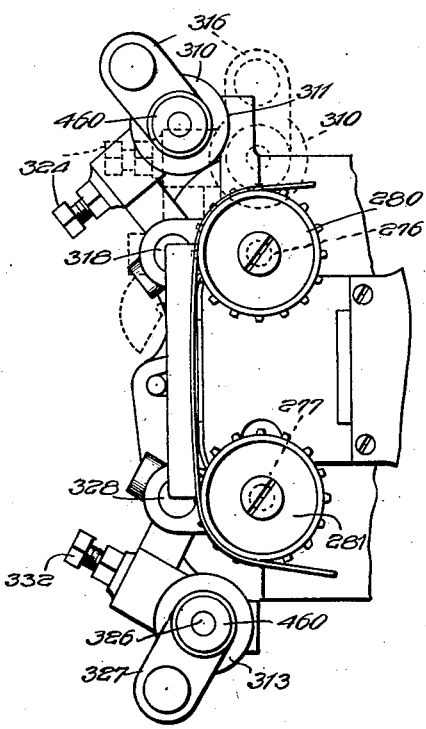
Figure 11:
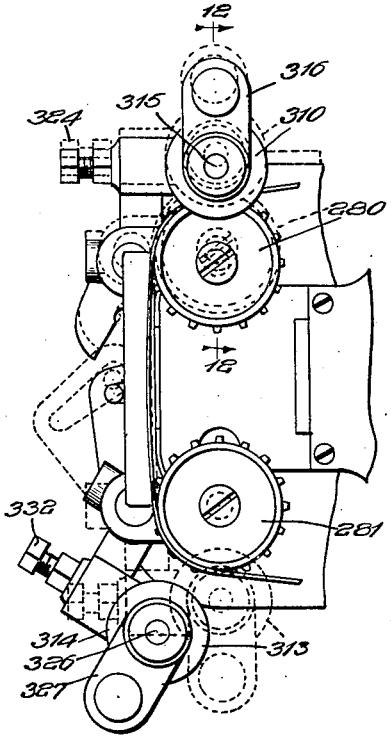
Figure 12:
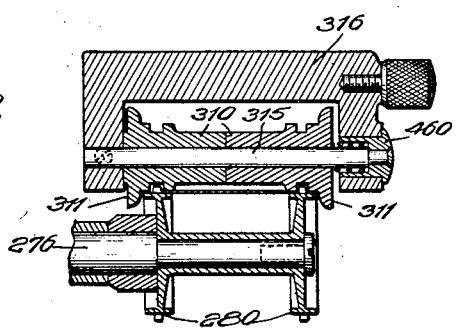
Figure 13:
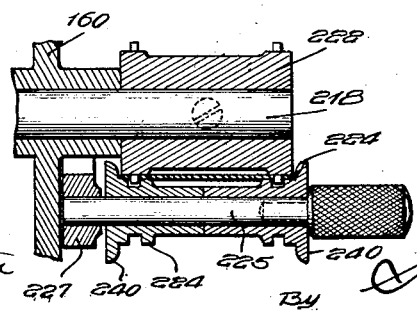

Figs. 8 and 9 are sections taken on lines 8—8 and 9—9, respectively, of Fig. 2;

Fig. 10 is a fragmentary side elevation of the intermediate sprockets and the mechanism associated therewith;

Fig. 11 is a fragmentary side elevation of the apparatus shown in Fig. 10, some of the parts being shown in changed positions;

Fig. 12 is a section taken on line 12—12 of Fig. 11;

Figs. 13 and 14 are sections taken on lines 13—13 and 14—14, respectively, of Fig. 1;

Fig. 15 is a section taken on line 15—15 of Fig. 14; and

Fig. 16 is a section taken on line 16—16 of Fig. 15.

Figure 4:
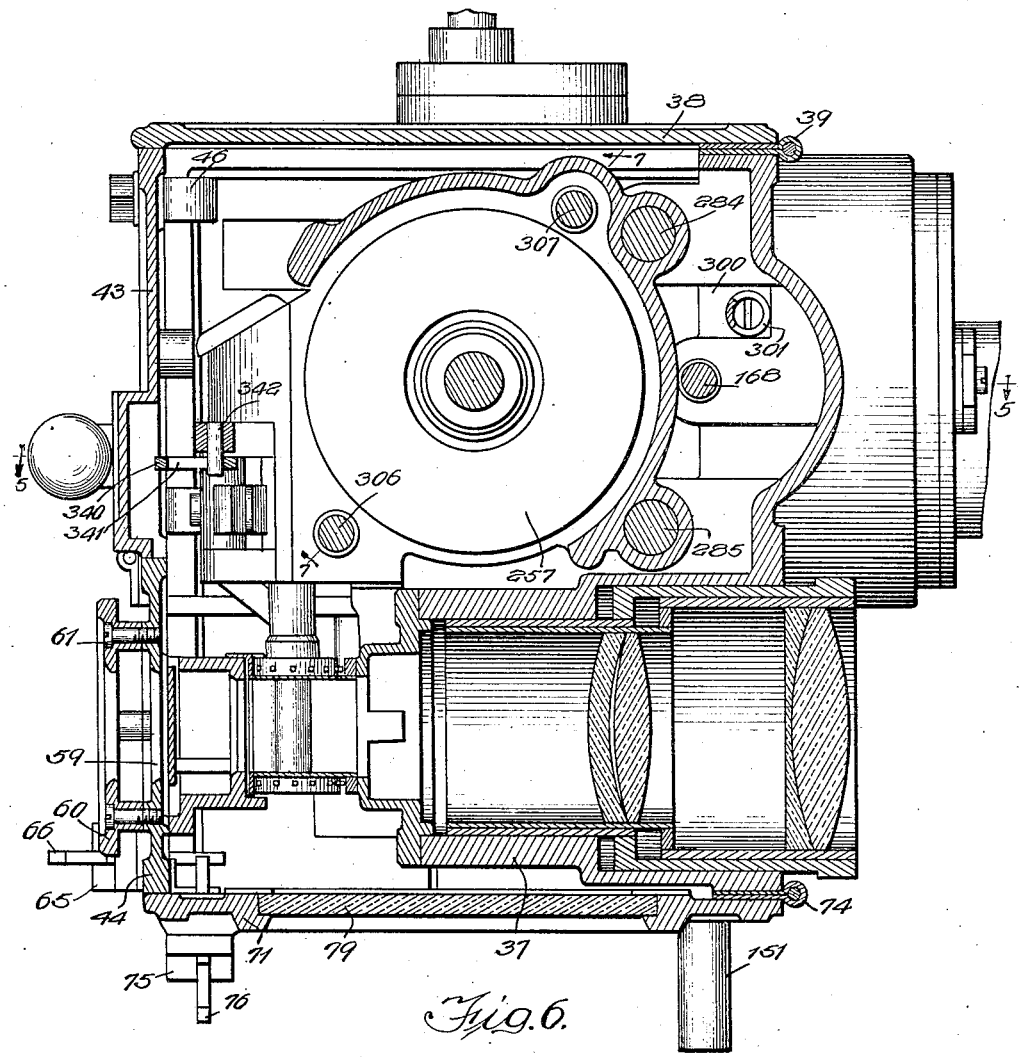
Fig. 4 is a section taken on line 4—4 of Fig. 2.
Figure 6:
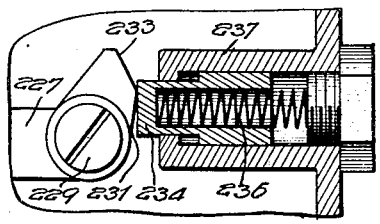
Fig. 6 is a fragmentary section taken from a mechanism which forms a part of my improved apparatus.

In the drawings, I have shown a preferred form of the invention embodied in motion picture projecting apparatus, the major portion of which is preferably enclosed within a housing 30. In this embodiment of the invention, the housing 30 comprises a bottom plate 31, a top plate 32, a front wall 33, a side wall 34 and a rear wall 35. Projecting inwardly from the front wall 33 and formed integral therewith is a tubular boss 37 adapted to accommodate a plurality of lenses, as will presently appear. The side wall 34 and the rear wall 35 do not entirely close the respective side and rear ends of the housing 30, the opening in the side wall 34 being normally closed by a door 38 hinged to the front wall 33 by a hinge 39 (Fig. 4). To hold the door 38 in its closed position, a spring latch member 41 secured to the door engages a shoulder 42 formed upon a panel 43, which, together with a door 44, normally closes the opening in the rear wall 35. The panel 43 is detachably secured to the top plate 32 and the rear wall 35 by spring clips 46 adapted to engage the rear wall 35 and a flange 47 projecting downwardly from the top plate 32, the spring clips 46 being secured to bolts 50 which are mounted in the panel 43 and may be rotated to disengage the clips from the rear wall and the flange 47.

The door 44 is mounted upon the panel 43 by hinges 56 and 57, and is provided with a light projecting aperture 59. The lighting apparatus is positioned immediately behind the aperture 59 but is not shown since it forms no part of this invention. The door 44 is protected from the heating effect of the light by a cooling plate 60, which is rigidly secured to the door by bolts or screws 61 (Fig. 4). The movement of the door is limited by a keeper 64 rigidly secured to the door and adapted to engage the downwardly projecting flange 47 when the door is swung to its open position (Fig. 1).

Pivotally mounted in a bracket 65 secured to the lower portion of the door 44 is a latch member 66 adapted to engage the upper edge of the rear wall 35 when the door is in its closed position. A compression spring 67 disposed in the bracket 65 yieldingly holds the latch member 66 in engagement with the rear wall 35.

That side of the housing 30, which is disposed directly opposite the side wall 34 is provided with a door 71, the door 71 being mounted upon the front wall 33 by a hinge 74. Pivotally mounted in a bracket 75 secured to the outer surface of the door 71 is a latch member 76 which is yieldingly urged by a spring 77 into a position wherein it will engage a keeper 78 secured to the inner surface of the door 44 (Fig. 13). It will be noted that the latch member 76 and the spring 77 are similar in construction to the latch member 66 and the spring 67, the latch members being so constructed that if their outer ends are depressed the doors 44 and 71 may be swung open. The door 71 is provided with a transparent panel 79, through which the operator may view the operation of the film feeding mechanism.

From the foregoing description of the housing 30, it is apparent that access may be readily had to the film feeding mechanism enclosed therein, as the doors 38, 44 and 71 may be opened with little effort on the part of the operator. If the operator so desires, the panel 43, together with the door 44, may be removed by disengaging the spring clips 46 from the rear wall 35 and the flange 47. In addition, each of the doors 44 and 71 may be opened independently of the other, or both of these doors may be swung to their open positions simultaneously. The construction of the spring clips 46 is more fully described in my co-pending application Serial No. 17,336, filed March 21, 1925.

The housing 30 is preferably mounted upon and secured to a motor support 80 carrying an electrical motor (not shown), the motor having a shaft being adapted to drive a friction disk (not shown) which may be brought into and out of driving engagement with friction disks 97 and 98 to drive a pinion 128 secured to a shaft 127, which is journaled in the housing 30. The means for operatively connecting the friction disks 97 and 98 with the motor is more fully shown and described in the above-mentioned co-pending application.

The pinion 128 meshes with a spur gear 150 secured upon a shaft 151, one end of which shaft projects from the housing and is adapted to receive a crank or the like, whereby the operator may drive the film feeding mechanism. Meshing with gear 150 is a gear 156 which is rotatably journaled upon a pin 157 projecting from a partition 160 formed integral with the front wall 33. The gear 156 meshes with a pinion 161 secured to a shaft 162 which is journaled in a bearing formed in the partition 160 and has rigidly secured to it a film take-up sprocket drum 164. A bevel gear 165 formed integral with the gear 150 meshes with a bevel gear 166 secured upon the lower end of a vertically disposed shaft 168, the shaft 168 being journaled in lugs formed upon the front wall 33. Also secured to the lower end of the vertically disposed shaft 168 is a spur gear 172 which meshes with an elongated pinion 173 secured to the lower end of a vertically disposed shaft 175. This construction permits the shaft 175 to be moved along its longitudinal axis without withdrawing the pinion 173 from operative engagement with the spur gear 172.

Formed integral with the spur gear 172 is a bevel gear 177 which meshes with a bevel gear 178 secured to a shaft 179, the shaft 179 being journaled in a bracket 188, which, in turn, is journaled in a hollow boss 183 projecting from the front wall 33. The shaft 179 is adapted to drive a shutter 194 (not shown) by means more fully shown and described in the aforementioned co-pending application.

Secured to the upper end of the shaft 168 is a spiral gear 212 which meshes with a spiral gear 213 formed upon a tubular member 214, the tubular member 214 being journaled in the housing 30 by means more clearly shown and described in the co-pending application. Also formed upon the tubular member 214 is a pinion (not shown) which meshes with a gear 217 secured to a shaft 218 rotatably journaled in the partition 160. Secured to one end of the shaft 218 and aligned with the take-up sprocket drum 164 is a feed sprocket drum 222. When the apparatus is in operation, the sprocket drums 164 and 222 are continuously driven and are adapted to withdraw the film from a supply reel (not shown) positioned above the housing 30.

Cooperating with each of the sprocket drums 164 and 222 is a plurality of grooved rollers 224 adapted to hold the film in proper engagement with the teeth of the sprocket drums (Fig. 9). The grooved rollers 224 are rotatably mounted upon pins 225 and 226 carried by a lever 227 which is pivotally mounted upon one of a plurality of pins 229 projecting from the partition 160. Each lever 227 is provided with two angularly disposed surfaces 231 and 233 engageable by a hollow pin 234 which is slidably urged toward the angularly disposed surfaces by a compression spring 236, the compression spring 236 being disposed in a hollow boss 237 which projects inwardly from the front wall 33 and in which the pin 234 is slidably journaled. It is apparent that when either of the pins 234 is in engagement with one of the associated angularly disposed surfaces 231 and 233, its spring 236 will yieldingly prevent angular displacement of the lever 227 into a position wherein the pin would engage the other of the angularly disposed surfaces. The arrangement is such that when a pin 234 is in engagement with the surface 231 the grooved rollers 224 will hold the film in mesh with the associated sprocket drum, and when the pin 234 is in engagement with the surface 233 these rollers 224 will be held in the positions wherein they are shown in dotted lines in Fig. 9.

Each grooved roller 224 is provided with a flange 240 adapted to engage an edge of the film so as to align the film with the sprocket drums. Associated with each sprocket drum 164 and 222 is a plate 243 secured to a pin 244 projecting from the partition. The plates 243 are adapted to strip the film from the sprocket drums in the event that the film tends to adhere thereto.

Figure 5:
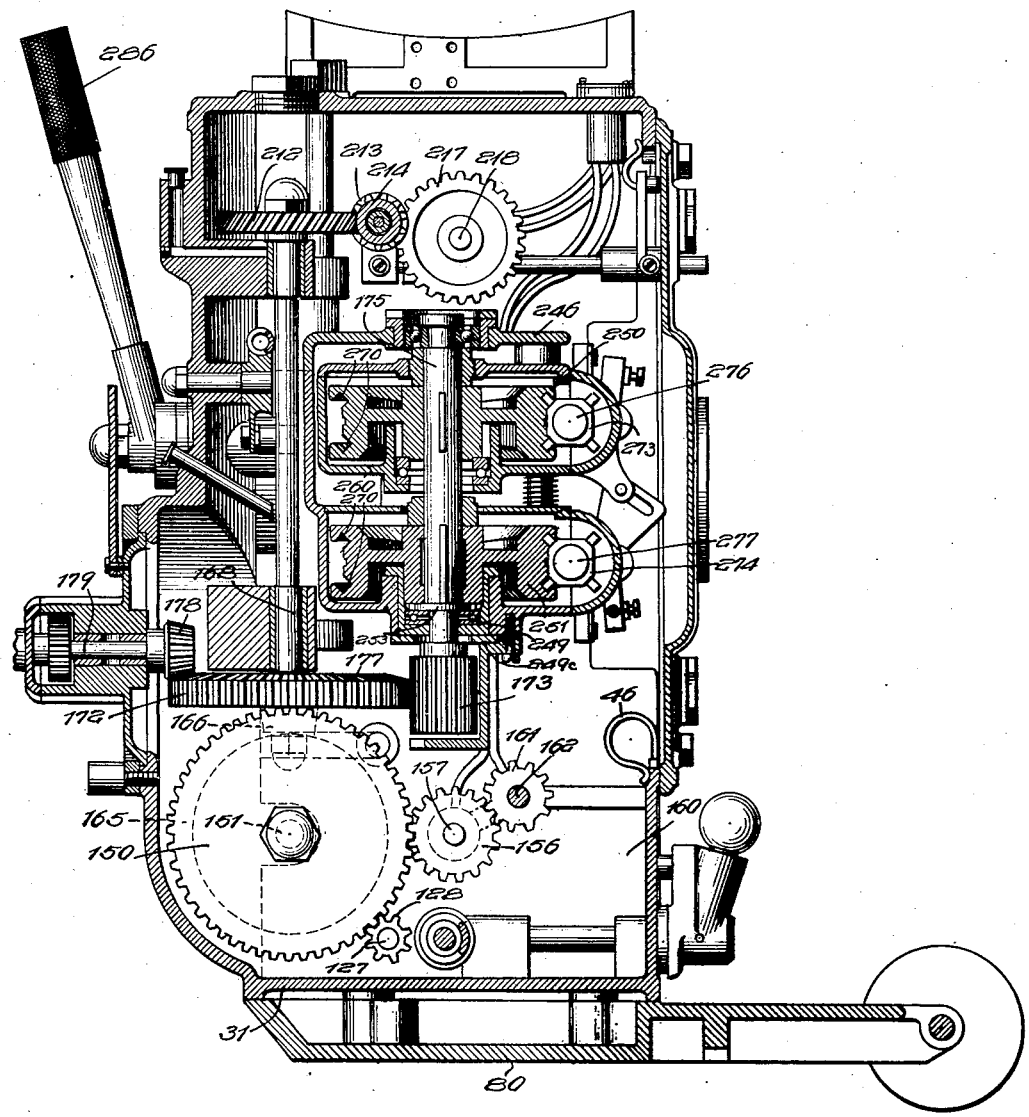
Fig. 5 is a section taken on line 5—5 of Fig. 4.
Figure 7:
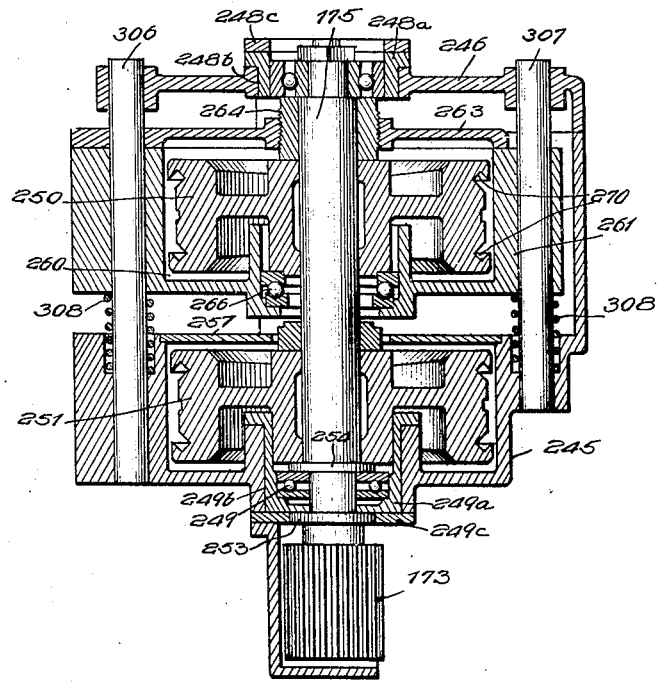
Fig. 7 is a section taken on line 7—7 of Fig. 4.

Referring now to Fig. 5, the aforementioned shaft 175 is rotatably mounted in a casing 245 and in a cap 246 which is secured to the casing. A ball bearing 248 has its outer race secured in a bushing 246$^a$ which is rotatably mounted in a bore 248$^b$ formed in the cap 246, the ball bearing being eccentrically disposed with respect to the longitudinal axis of the bore. One race of a ball bearing 249 is secured in a bushing 249$^a$ rotatably journaled in a bore 249$^b$ formed in the casing 245. The ball bearing 249 is eccentrically disposed with the longitudinal axis of the bore 249$^b$. The bushings 248$^a$ and 249$^a$ are provided with levers 248$^c$ and 249$^c$, respectively, whereby the bushings may be rotated to adjust mechanism hereinafter described. Mounted upon the shaft 175 are cams 250 and 251, the cam 251 being keyed to the shaft 175 and being held against longitudinal displacement relative to the shaft by a collar 253 formed upon the shaft and by a collar 254 driven upon the shaft. The cam 251 is disposed in a well 256 formed in the lower portion of the casing 245, the well 256 being provided with a closure plate 257 and being adapted to hold any suitable lubricant. The cam 250 is splined upon the shaft 175 and is disposed in a well 260 formed in a casing 261 provided with a cap 263, the well 260 being also adapted to hold a supply of lubricant. A sleeve 264 threaded into the cap 263 and a ball bearing 266 interposed between the cam 250 and the casing 261 prevent longitudinal displacement of this cam relative to the casing 261. The cam 250 and the casing 261 with its cap 263 may move as a unit up and down upon the shaft 175, the cam being constrained to rotate with the shaft. The cams 250 and 251 are preferably of the type disclosed in my United States Patent No. 1,170,991, of February 8th, 1916, and each cam is provided with a pair of oppositely inclined counterpart grooves 270 adapted to be engaged and traversed by a plurality of prongs 271 radially disposed upon one of a plurality of star wheels 273 and 274, the star wheel 273 being associated with the cam 250 and the star wheel 274 being associated with the cam 251. The cams 250 and 251 may be accurately aligned with the star wheels 273 and 274, respectively, by manipulating the levers 248$^c$ and 249$^c$ to move the shaft 175 relatively to the star wheels.

As clearly described in the aforementioned patent, each revolution of one of the cams 250 and 251 is accompanied by rotation of the associated star wheel through an angle of 90 degrees, so that when the cams 250 and 251 are continuously driven the star wheels 273 and 274 will be intermittently driven. The star wheels 273 and 274 are rigidly secured to shafts 276 and 277, respectively, the shaft 276 being rotatably journaled in the casing 261 and the shaft 277 being rotatably journaled in the casing 245. Secured to the shafts 276 and 277, respectively, and aligned with the sprocket drums 164 and 222 are sprockets 280 and 281.

The casing 245 is slidably journaled upon a pair of vertically disposed pins 284 and 285, and may be raised and lowered by means comprising a lever 286, which is secured to a shaft 287 pivotally mounted in the front wall 33, the shaft 287 having a lever 288 secured to its inner end, which lever 288 carries an anti-friction roller 289 engaging a groove 290 formed in the casing 245. The pins 284 and 285 are provided with hexagonal heads 284$^a$ and 285$^a$, respectively, adapted to receive a wrench or the like, and they are screw-threaded into the top plate 32. Lugs 283 formed upon the front wall 33 are apertured to receive the shank portions of the pins 284 and 285. The anti-friction roller 289 is journaled upon a pin 291 mounted in the free end of the lever 288. Secured to a lug 300 formed upon the front wall 33 is one end of a helical spring 301, which is trained over a sheave 302 and has its other end secured to the pin 291. The arrangement is such that the spring 301 counterbalances the casings 245 and 261 and the mechanism carried thereby. It will presently appear that the lever 276 may be manipulated to raise and lower the casings 245 and 261 and the mechanism carried thereby as a unit, and that the intermediate sprockets 280 and 281 may be brought into a plurality of adjusted positions with respect to a light projecting aperture 303 formed in a plate 304 mounted upon the inner side of the door 44 (Fig. 12). This is to permit the pictures to be properly framed upon the screen.

Projecting through the casing 261 and rigidly secured thereto are a pair of vertically disposed pins 306 and 307, which are slidably journaled in the casing 245 and the cap 246. Compression springs 308 disposed around the pins 306 and 307 are interposed between the casings 245 and 246 and tend to hold the casing 261 in a position wherein the sleeve 264 bears against the inner race of the ball bearing 248. This construction permits the sprockets 280 to be moved toward the sprockets 281 when the film is to be threaded through the apparatus so that the springs 308 may afterwards increase the distance between sprocket drums 280 and 281 to draw the film taut.

The film is held in engagement with the teeth of the sprockets 280 by a pair of grooved rollers 310 having flanges 311 adapted to engage the edges of the film. In a like manner the film is held in engagement with the teeth of the sprockets 281 by a pair of grooved rollers 313 having flanges 314 adapted to engage the edges of the film. The grooved rollers 310 are rotatably journaled upon a pin 315 carried in a bracket 316 which is pivotally mounted upon a pin 318 secured in a pair of lugs 319 formed integral with the casing 261. The rollers 310 may be swung out of their functionally operative positions whenever a film is to be threaded through the apparatus. The grooved rollers 313 are carried by a pin 326 mounted in a threading lever or bracket 327 which is, in turn, pivotally mounted upon a pin 328, the pin 328 being secured in a pair of lugs 329 formed upon the casing 245. The rollers 313 may be swung into and out of their functionally operative positions with respect to the sprockets 281.

The functionally operative positions of the grooved rollers 310 and 313 may be varied to a relatively small extent by screws 324 and 332, the screw 324 being threaded into the bracket 316 and the screw 332 being threaded into the bracket 327 (Figs. 2 and 8). Each of the brackets 316 and 317 is provided with angularly disposed surfaces 334 and 335, the angularly disposed surfaces of the bracket 316 being engageable by a leaf spring 320 secured to the casing 261, and the angularly disposed surfaces of the bracket 327 being engageable by a leaf spring 330 secured to the casing 245. When the grooved rollers 310 and 313 are in their functionally operative positions, the leaf springs 320 and 330 will engage the respective surfaces 335 of the brackets 316 and 327 to yieldingly hold the brackets against annular displacement. In a like manner, when the grooved rollers 310 and 313 are disposed in their functionally inoperative positions, the leaf springs 320 and 330 will engage the respective surfaces 334 and yieldingly hold the brackets against displacement around their pivotal axes.

One end of each pin 315 and 326 is secured in one of a plurality of bushings 460 seated in the brackets 316 and 327. Interposed between each bushing 460 and its associated rollers 310 or 313 is a compression spring 461. Each spring 461 permits its associated pair of rollers 310 or 313 to adjust themselves to the film so that the picture being projected any time will not move relatively to the source of light.

Secured to the bracket 327 is a plate 340 having a cam slot 341 in which rides a pin 342 projecting from a lug 344 formed integral with the casing 261 (Fig. 8). The cam slot 341 is so designed that when the rollers 313 are brought into their functionally inoperative positions with respect to the sprockets 281, the casing 261 will be drawn toward the casing 245 against the action of the springs 308. This, as hereinbefore explained, permits the film to be trained over the sprockets 280 and 281 in such manner that when the rollers 313 are restored to their functionally operative positions the strip of film between the sprockets 280 and the sprocket 281 is suitably tensioned.

Figure 3:
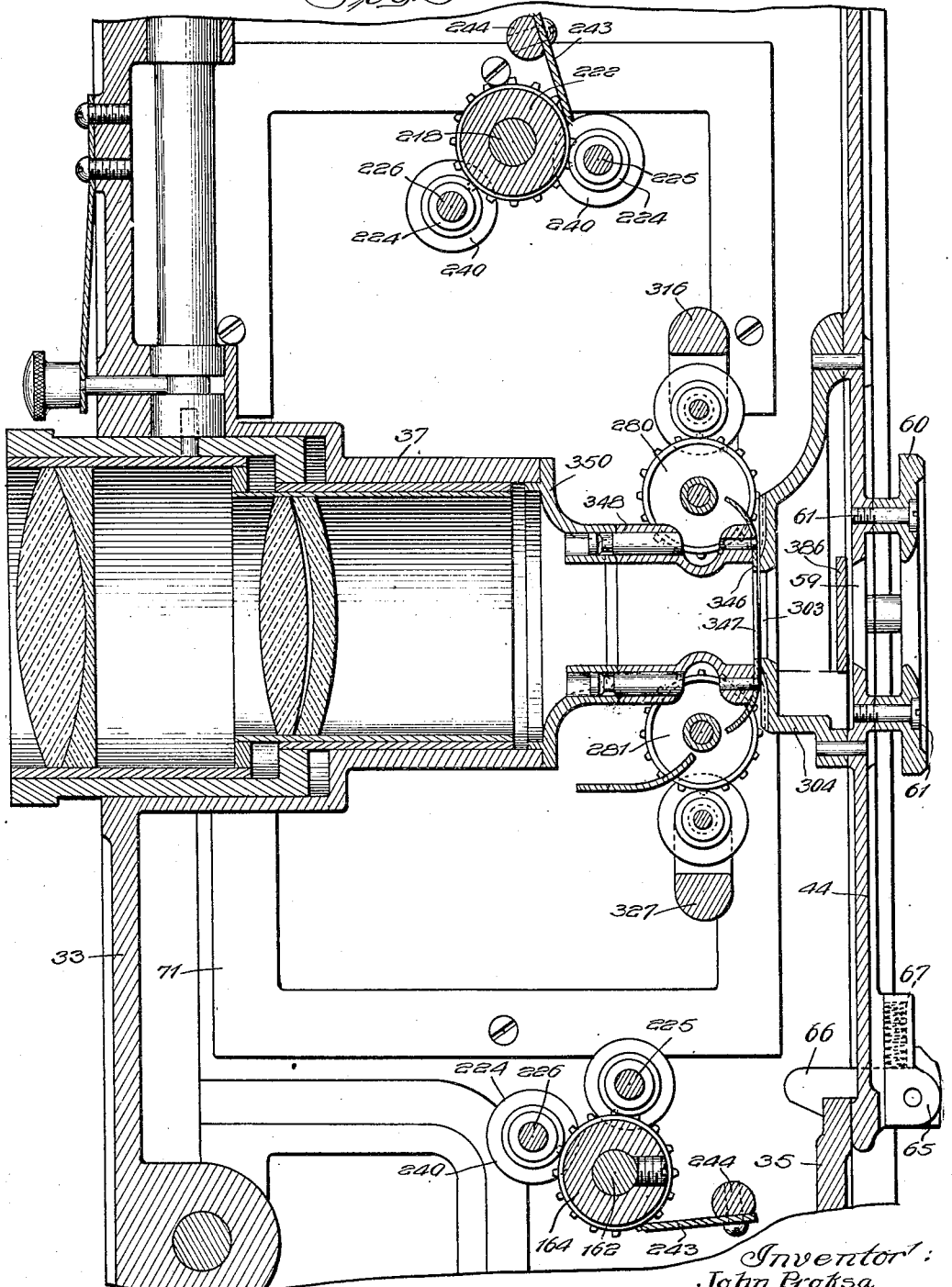
Fig. 3 is a section taken on line 3—3 of Fig. 2.

As best shown in Fig. 3, a plate 346 is positioned intermediate the sprockets 280 and 281, the plate 346 being in close proximity to the plate 304 when the door 44 is closed. During the operation of the apparatus the film passes through the slot so formed between the plates 304 and 346. The plate 346 is provided with a light projecting aperture 347 aligned with the aperture 303 and designed to cooperate with the aperture 303 to frame the pictures. The plate 346 is secured to a tubular member 348, the tubular member 348 being detachably secured to an apertured cap 350 closing the inner end of the tubular boss 37. Mounted in the tubular boss 37 are lenses 370 and 371.

Carried by the door 44 and disposed intermediate this door and the plate 304 is a fire door 386, which is pivotally mounted upon the door. The fire door 386 is controlled by means including the tubular member 214 and more clearly shown and described in the aforementioned co-pending application. This means is so designed that the fire door 386 will not uncover the several light projecting apertures unless the film is being advanced at a predetermined speed.

Mounted upon the upper surface of the top plate 32 is a bracket 440 in which are journaled a plurality of rollers 441, the rollers 441 being disposed in pairs, one pair being arranged above the other. The rollers 441 are aligned with the sprocket drum 222 and are adapted to guide the film to the sprocket drum. The rollers 441 also function to prevent destruction of the film, in that, if the portion of film which is passing through the housing 30 is set on fire, the flame cannot pass the rollers and cause the film on the supply reel to become damaged. The top plate 32 and the bottom plate 31 are provided with slots 444 and 445, respectively, through which the film may be passed when it is being threaded through the apparatus. The slots 444 and 445 extend inwardly from the side edges of the top plate 32 and the bottom plate 31, respectively, as is more clearly shown in the above mentioned co-pending application.

In the operation of the apparatus a loaded supply reel (not shown) is positioned above the housing 30 and an empty take-up reel (not shown) is positioned below the housing, means (not shown) being provided whereby the take-up reel may be driven. After the doors 44 and 71 have been opened, the grooved rollers 224 are moved in the positions wherein they are shown in dotted lines in Fig. 1 and the grooved rollers 310 and 313 are moved in their functionally inoperative positions with respect to the intermediate sprockets 280 and 281, respectively. Movement of the grooved rollers 313 to their functionally inoperative positions is accompanied, of course, by movement of the sprockets 280 toward the sprockets 281. A section of film is then withdrawn from the supply reel and passed through the slots 444 and 445 into alignment with the sprocket drums 222 and 164 and the sprockets 280 and 281. This section of the film is passed underneath and partially around the sprocket drum 222 after which it is passed over the sprockets 280 and underneath the sprockets 281. The film is then passed over the sprocket drum 164, the free end of the film being secured to the take-up reel in any suitable manner. The manner in which the film is threaded through the apparatus in this particular embodiment of the invention is illustrated in Fig. 1. The invention is not limited to the arrangement of parts herein shown and described as these parts may be rearranged without departing from the spirit of this invention, or equivalent structure may be substituted for these parts. The grooved rollers 310 and 313 are then restored to their functionally operative positions, thus causing the sprockets 280 to draw away from sprockets 281 so as to tension that portion of film disposed between the sprockets. The grooved rollers 224 are then moved into the position wherein they are shown in full lines in Fig. 1. The doors 44 and 71 may then be closed after which the apparatus may be set in motion. The individual pictures may be made to register properly with the light projecting apertures by manipulating the lever 286 to raise or lower the sprockets 280 and 281 in the manner above described.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In apparatus of the kind described and in combination, rotatable means for intermittently advancing the film, a second rotatable means for intermittently advancing the film, said second rotatable means being spaced from the first rotatable means, yielding means for causing relative motion between the first rotatable means and the second rotatable means to tension the film, and means operatively connected to each of the rotatable means for displacing one of them relative to the other against the action of the yielding means.

2. In apparatus of the kind described and in combination, rotatable means for intermittently advancing the film, a second rotatable means for intermittently advancing the film, said second rotatable means being spaced from the first rotatable means, yielding means for causing relative motion between the first rotatable means and the second rotatable means to tension the film, and means including a member having a cam surface for displacing one of the rotatable means relative to the other against the action of the yielding means.

3. In apparatus of the kind described and in combination, a rotatable member engageable with a film for intermittently advancing it, a second rotatable member constrained to rotate in unison with said first member and engageable with the film to advance it, means for drawing one of said members toward the other, and yieldable means for causing relative motion between the rotatable members to tension the film.

4. In apparatus of the kind described and in combination, a rotatable member engageable with a film for intermittently advancing it, a second rotatable member constrained to rotate in unison with said first member and engageable with the film to advance it, means operatively connected to each of said members for drawing said first member toward said second member, and means for urging said first member away from said second member to tension the film.

5. In apparatus of the kind described and in combination, a rotatable member engageable with a film for intermittently advancing it, a second rotatable member constrained to rotate in unison with said first member and engageable with the film to advance it, cam means for drawing said first member toward said second member, and yielding means for urging said first member away from said second member to tension the film.

6. In apparatus of the kind described and in combination, a rotatable member engageable with the film for intermittently advancing it, a second rotatable member constrained to rotate in unison with said first member and engageable with the film to advance it, means movable into and out of a functionally operative position for holding the film in engagement with one of said members, means responsive to movement of said last-mentioned means out of its functionally operative position for causing relative movement of said members toward each other, and yielding means for urging one of the members in a direction away from the other to tension the film.

7. In apparatus of the kind described and in combination, a rotatable member engageable with the film for intermittently advancing it, a second rotatable member constrained to rotate in unison with said first member and engageable with the film to advance it, film guiding means movable into and out of a functionally operative position, means responsive to movement of said last mentioned means out of its functionally operative position for causing movement of one of said members toward the other, and means for causing relative movement of the members toward each other to tension the film.

In testimony whereof, I have hereunto signed my name.

JOHN PROKSA.